United States Patent
Sakamine et al.

(10) Patent No.: US 9,573,021 B2
(45) Date of Patent: Feb. 21, 2017

(54) GOLF BALL

(71) Applicant: DUNLOP SPORTS CO., LTD., Kobe-shi, Hyogo (JP)

(72) Inventors: Ryota Sakamine, Kobe (JP); Katsumi Terakawa, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 0 days.

(21) Appl. No.: 14/672,648

(22) Filed: Mar. 30, 2015

(65) Prior Publication Data

US 2015/0273277 A1    Oct. 1, 2015

(30) Foreign Application Priority Data

Mar. 31, 2014 (JP) ................. 2014-074633

(51) Int. Cl.
  A63B 37/02  (2006.01)
  C08L 9/00   (2006.01)
  A63B 37/00  (2006.01)

(52) U.S. Cl.
  CPC ....... A63B 37/0051 (2013.01); A63B 37/0062 (2013.01); A63B 37/0063 (2013.01); A63B 37/0074 (2013.01); C08L 9/00 (2013.01); A63B 37/0076 (2013.01); C08L 2205/22 (2013.01)

(58) Field of Classification Search
  None
  See application file for complete search history.

(56) References Cited

U.S. PATENT DOCUMENTS

| | | | |
|---|---|---|---|
| 5,050,886 A * | 9/1991 | Yamagishi | A63B 37/0003 473/372 |
| 6,139,447 A | 10/2000 | Ohama | |
| 6,193,920 B1 * | 2/2001 | Moriyama | B29C 39/10 264/250 |
| 6,494,794 B1 | 12/2002 | Ohama | |
| 6,645,091 B2 * | 11/2003 | Wu | A63B 37/0003 473/372 |
| 2003/0148826 A1 * | 8/2003 | Ohama | A63B 37/0003 473/371 |
| 2007/0093318 A1 * | 4/2007 | Bartsch | A63B 37/0003 473/371 |
| 2008/0249251 A1 | 10/2008 | Wachi | |
| 2009/0227395 A1 * | 9/2009 | Sullivan | A63B 37/0062 473/377 |
| 2013/0005505 A1 * | 1/2013 | Sajima | A63B 37/0051 473/372 |
| 2013/0172107 A1 | 7/2013 | Higuchi et al. | |
| 2013/0172108 A1 | 7/2013 | Higuchi et al. | |
| 2014/0287851 A1 * | 9/2014 | Bulpett | A63B 37/0073 473/371 |

FOREIGN PATENT DOCUMENTS

| | | | |
|---|---|---|---|
| JP | 6-7481 A | | 1/1994 |
| JP | 07185039 | * | 7/1995 |
| JP | 11-128400 A | | 5/1999 |
| JP | 2001-104518 A | | 4/2001 |
| JP | 2003-79765 A | | 3/2003 |
| JP | 2013-138839 A | | 7/2013 |
| JP | 2013-138840 A | | 7/2013 |
| PK | 2008-253757 A | | 10/2008 |

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball excellent in shot feeling, flight distance and durability. The present invention provides a golf ball comprising a spherical core and at least one cover layer covering the spherical core, wherein the spherical core is formed from a core rubber composition containing (a) a base rubber, (b) a co-crosslinking agent, (c) a crosslinking initiator, and (x) a crosslinked rubber powder; (x) the crosslinked rubber powder contains (x1) soft particles with a hardness difference (Hs−Hp) between a particle hardness (Hp) of the soft particles and a surface hardness (Hs) of the spherical core being 20 or more in JIS-C hardness, and a hardness difference (Hs5−Hp) between the particle hardness (Hp) of the soft particles and a hardness (Hs5) at 5 mm point inside the surface of the spherical core being 15 or more in JIS-C hardness; and the core rubber composition contains (x1) the soft particles in an amount of 1.0 mass % or more.

18 Claims, 1 Drawing Sheet

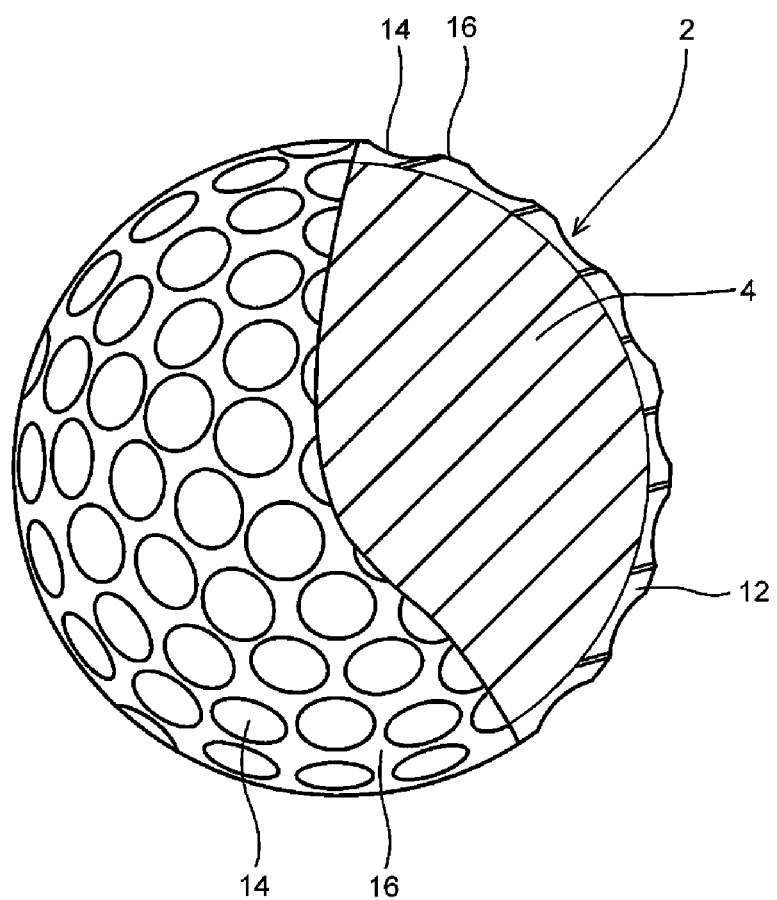

GOLF BALL

FIELD OF THE INVENTION

The present invention relates to a golf ball, in particular, a technology for improving durability while maintaining a shot feeling and flight distance.

DESCRIPTION OF THE RELATED ART

Conventionally, a golf ball comprising a core and a cover covering the core has been proposed. Among these golf balls, a golf ball comprising a core made from a rubber composition containing a vulcanized rubber powder has been proposed.

For example, Japanese Patent Publication No. H6-7481 A discloses a golf ball composed of a one-layered structure, or a golf ball composed of at least two layered structure comprising an outer skin and an inner core having at least one layer, wherein the golf ball composed of the one-layered structure, or the inner core of the golf ball composed of at least two layered structure contains a vulcanized rubber powder (refer to claim 1 of Japanese Patent Publication No. H6-7481 A).

Japanese Patent Publication No. H11-128400 A discloses a golf ball composed of a one-layered structure, or a golf ball composed of at least two-layered structure of a core having at least one layer and a cover having at least one layer, wherein the golf ball composed of the single-layered structure, or the core of the golf ball composed of at least two layered structure is a vulcanized-molded product of a rubber composition containing 5 to 60 parts by weight of a vulcanized rubber powder with respect to 100 parts by weight of a base rubber, and wherein the base rubber is composed of a mixture of (A) polybutadiene having a Mooney viscosity of 40 to 65 and (B) polybutadiene having a Mooney viscosity of 20 to 35 in a weight ratio of (A) polybutadiene/(B) polybutadiene being 40/60 to 90/10 (refer to claim 1 of Japanese Patent Publication No. H11-128400 A). In addition, these documents describe the core in which no vulcanized rubber powder is contained preferably has a hardness similar to that of the vulcanized rubber powder (refer to 0011 of Japanese Patent Publication No. H6-7481 A, and 0012 of Japanese Patent Publication No. H11-128400 A).

Examples of the golf ball characterizing in material properties of the vulcanized rubber powder are Japanese Patent Publication No. 2003-79765 A and No. 2008-253757 A. Japanese Patent Publication No. 2003-79765 A discloses a golf ball composed of at least two layered structure comprising a core and a cover, wherein the core contains 1 to 15 parts by mass of a vulcanized rubber powder crosslinked by a magnesium salt of an unsaturated carboxylic acid with respect to 100 parts by mass of a base rubber, and the core has a compression deformation amount of 2.0 to 7.0 mm when applying a load from 98 N to 1274 N to the core (refer to claim 1 of Japanese Patent Publication No. 2003-79765 A). Japanese Patent Publication No. 2008-253757 A discloses a golf ball comprising, as a constituting element, a hot-molded product obtained by vulcanizing a rubber composition containing a base rubber and an unsaturated carboxylic acid or salt thereof as essential components, wherein the rubber composition further contains a vulcanized rubber powder from which soluble ingredients have been removed by liquid washing (refer to claim 1 of Japanese Patent Publication No. 2008-253757 A).

Japanese Patent Publication No. 2001-104518 A discloses a golf ball comprising a core, wherein the core is formed from a rubber composition containing a vulcanized rubber powder, and a hardness of the core and a hardness of the cover satisfy a specific equation (refer to claims 1 and 0032 of Japanese Patent Publication No. 2001-104518 A). Japanese Patent Publication No. 2013-138839 A and No. 2013-138840 A disclose a golf ball comprising a core and a cover, wherein the core is formed from a rubber composition containing a rubber powder or a polyurethane powder, and a resin material for the cover has specific properties (refer to claim 1 of Japanese Patent Publication No. 2013-138839 A, and claim 1 of Japanese Patent Publication No. 2013-138840 A).

SUMMARY OF THE INVENTION

As a method for improving a flight distance of a golf ball on driver shots, for example, there is a method of controlling an outer-hard inner-soft core hardness distribution. When the core has an outer-hard inner-soft structure, the surface hardness of the core becomes large. When the core having a high surface hardness is repeatedly hit by a golf club, the core surface is easy to crack, thus the durability of the core tends to deteriorate. In addition, the core having a high surface hardness tends to have a lowered shot feeling. Herein, as a method for improving the durability and shot feeling of the core, there is a method of lowering the hardness of the whole core. However, if the hardness of the whole core is lowered, the coefficient of restitution decreases, resulting in a short flight distance. The present invention has been achieved in view of the above circumstances, and an object of the present invention is to provide a golf ball excellent in a shot feeling, flight distance and durability.

The present invention provides a golf ball comprising a spherical core and at least one cover layer covering the spherical core, wherein the spherical core is formed from a core rubber composition containing (a) a base rubber, (b) a co-crosslinking agent, (c) a crosslinking initiator, and (x) a crosslinked rubber powder; and (x) the crosslinked rubber powder contains (x1) soft particles with a hardness difference (Hs−Hp) between a particle hardness (Hp) of the soft particles and a surface hardness (Hs) of the spherical core being 20 or more in JIS-C hardness, and a hardness difference (Hs5−Hp) between the particle hardness (Hp) of the soft particles and a hardness (Hs5) at 5 mm point inside the surface of the spherical core being 15 or more in JIS-C hardness; and the core rubber composition contains (x1) the soft particles in an amount of 1.0 mass % or more. The present invention having such a configuration can improve the durability of the golf ball while maintaining the shot feeling and resilience performance of the golf ball.

The present invention provides a golf ball excellent in a shot feeling, flight distance and durability.

BRIEF DESCRIPTION OF THE DRAWINGS

FIG. 1 is a partially cutaway sectional view showing the golf ball according to one embodiment of the present invention.

DESCRIPTION OF THE PREFERRED EMBODIMENT

The golf ball of the present invention comprises a spherical core and at least one cover layer covering the spherical core, wherein the spherical core is formed from a core rubber composition containing (a) a base rubber, (b) a co-crosslinking agent, (c) a crosslinking initiator, and (x) a crosslinked rubber powder; and (x) the crosslinked rubber powder contains (x1) soft particles with a hardness difference (Hs−Hp) between a particle hardness (Hp) of the soft particles and a surface hardness (Hs) of the spherical core being 20 or more in JIS-C hardness, and a hardness difference (Hs5−Hp) between the particle hardness (Hp) of the soft particles and a hardness (Hs5) at 5 mm point inside the surface of the spherical core being 15 or more in JIS-C hardness; and the core rubber composition contains (x1) the soft particles in an amount of 1.0 mass % or more.

Blending (x1) the soft particles which have a sufficiently lower hardness than the surface hardness (Hs) of the spherical core and the hardness (Hs5) at 5 mm point inside the surface of the spherical core suppresses cracking near the spherical core surface, and thus improves the durability of the core. Further, blending (x1) the soft particles having a low hardness improves the shot feeling. Moreover, even in the case of blending (x1) the soft particles, the coefficient of restitution of the spherical core depends upon the hardness of the rubber component which is a matrix. Accordingly, the durability of the obtained spherical core can be improved while maintaining the resilience and shot feeling of the obtained spherical core.

The hardness difference (Hs−Hp) between the surface hardness (Hs) of the spherical core and the particle hardness (Hp) of (x1) the soft particles is 20 or more, preferably 21 or more, more preferably 22 or more, and is preferably 64 or less, more preferably 50 or less, even more preferably 45 or less in JIS-C hardness. If the hardness difference (Hs−Hp) is 64 or less, the durability improvement effect further increases, since the crosslinked degree of (x1) the soft particles is high and (x1) the soft particles are difficult to dissolve in the matrix material when kneading.

The hardness difference (Hs5−Hp) between the hardness (Hs5) at 5 mm point inside the surface of the spherical core and the particle hardness (Hp) of (x1) the soft particles is 15 or more, preferably 17 or more, more preferably 19 or more, and is preferably 60 or less, more preferably 30 or less, even more preferably 23 or less in JIS-C hardness. If the hardness difference (Hs5−Hp) is 60 or less in JIS-C hardness, the durability improvement effect further increases, since the crosslinked degree of (x1) the soft particles is high and (x1) the soft particles are difficult to dissolve in the matrix material when kneading.

The spherical core preferably has a surface hardness (Hs) of 75 or more, more preferably 77 or more, even more preferably 78 or more, particularly preferably 80 or more in JIS-C hardness. In addition, the spherical core preferably has a surface hardness (Hs) of 95 or less, more preferably 91 or less in JIS-C hardness. If the surface hardness of the spherical core is 75 or more in JIS-C hardness, the spherical core does not become excessively soft, thus good resilience may be obtained. Further, if the surface hardness of the spherical core is 95 or less in JIS-C hardness, the spherical core does not become excessively hard, thus good shot feeling may be obtained.

The hardness (Hs5) at 5 mm point inside the surface of the spherical core is preferably 73 or more, more preferably 74 or more, and is preferably 85 or less, more preferably 81 or less, even more preferably 80 or less in JIS-C hardness. If the hardness at 5 mm point inside the surface of the spherical core is 73 or more in JIS-C hardness, the spherical core does not become excessively soft, thus good resilience may be obtained. In addition, if the hardness at 5 mm point inside the surface of the spherical core is 85 or less in JIS-C hardness, the spherical core does not become excessively hard, thus good shot feeling may be obtained.

The spherical core preferably has a center hardness (Ho) of 35 or more, more preferably 40 or more, even more preferably 46 or more in JIS-C hardness. In addition, the spherical core preferably has a center hardness (Ho) of 55 or less, more preferably 52 or less, even more preferably 50 or less in JIS-C hardness. If the center hardness of the spherical core is 35 or more in JIS-C hardness, the spherical core does not become excessively soft, thus good resilience may be obtained. Further, if the center hardness is 55 or less in JIS-C hardness, the spherical core does not become excessively hard, thus good shot feeling may be obtained.

The spherical core preferably has a hardness difference (Hs−Ho) between the surface hardness (Hs) and the center hardness (Ho) of 25 or more, more preferably 28 or more, even more preferably 30 or more in JIS-C hardness, and preferably has a hardness difference (Hs−Ho) of 45 or less, more preferably 42 or less, even more preferably 40 or less in JIS-C hardness. If the hardness difference between the core surface hardness and the core center hardness is large, a golf ball travelling a great flight distance due to a high launch angle and low spin rate may be obtained.

The spherical core preferably has a diameter of 34.8 mm or more, more preferably 36.8 mm or more, even more preferably 38.8 mm or more, and preferably has a diameter of 42.2 mm or less, more preferably 41.8 mm or less, even more preferably 41.2 mm or less, most preferably 40.8 mm or less. If the spherical core has a diameter of 34.8 mm or more, the thickness of the cover does not become excessively thick, thus the resilience becomes better. On the other hand, if the spherical core has a diameter of 42.2 mm or less, the thickness of the cover does not become excessively thin, thus the cover functions better.

When the spherical core has a diameter ranging from 34.8 mm to 42.2 mm, a compression deformation amount (a shrinking amount of the spherical core in the compression direction thereof) of the spherical core when applying a load from an initial load of 98 N to a final load of 1275 N to the spherical core is preferably 2.0 mm or more, more preferably 2.8 mm or more, and is preferably 6.0 mm or less, more preferably 5.0 mm or less. If the compression deformation amount is 2.0 mm or more, the shot feeling becomes better. Further, if the compression deformation amount is 6.0 mm or less, the resilience becomes better.

The spherical core preferably has coefficient of restitution of 0.770 or more, more preferable 0.780 or more, even more preferable 0.790 or more. If the coefficient of restitution of the spherical core is 0.770 or more, the flight distance further improves.

The spherical core is formed from a core rubber composition containing (a) a base rubber, (b) a co-crosslinking agent, (c) a crosslinking initiator, and (x) a crosslinked rubber powder. As (a) the base rubber, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely, or two or more of these rubbers may be used in combination. Among them, typically preferred is a high cis-polybutadiene having a cis-1,4 bond in a proportion of 40 mass % or more, more preferably 80 mass % or more, and even more preferably 90 mass % or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene preferably includes one synthesized using a rare earth element catalyst. When a neodymium catalyst, which employs a neodymium compound of a lanthanum series rare earth element compound, is used, a polybutadiene rubber having a high content of cis-1,4 bond and a low content of 1,2-vinyl bond is obtained with excellent polymerization activity. Such a polybutadiene rubber is particularly preferred. The high-cis polybutadiene preferably has a Mooney viscosity ($ML_{1+4}(100°\ C.)$) of 30 or more, more preferably 32 or more, even more preferably 35 or more, and preferably has a Mooney viscosity ($ML_{1+4}(100°\ C.)$) of 140 or less, more preferably 120 or less, even more preferably 100 or less, most preferably 80 or less. It is noted that the Mooney viscosity ($ML_{1+4}(100°\ C.)$) in the present invention is a value measured according to JIS K6300-1 (2013) using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, most preferably 2.6 or more, and preferably has a molecular weight distribution Mw/Mn of 6.0 or less, more preferably 5.0 or less, even more preferably 4.0 or less, most preferably 3.4 or less. If the molecular weight distribution (Mw/Mn) of the high-cis polybutadiene is excessively low, the processability may deteriorate. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

(b) The co-crosslinking agent has an action of crosslinking a rubber molecule by graft polymerization to a base rubber molecular chain. As (b) the co-crosslinking agent, an α,β-unsaturated carboxylic acid having 3 to 8 carbon atoms and/or a metal salt thereof is preferable. The α,β-unsaturated carboxylic acid used as (b) the co-crosslinking agent preferably has 3 to 8 carbon atoms, more preferably has 3 to 6 carbon atoms, even more preferably has 3 or 4 carbon atoms. Examples of the α,β-unsaturated carboxylic acid having 3 to 8 carbon atoms include acrylic acid, methacrylic acid, fumaric acid, maleic acid, crotonic acid, and the like.

Examples of the metal constituting the metal salt of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum or the like; and other metal ions such as tin, zirconium or the like. The above metal ions can be used solely or as a mixture of at least two of them. Among these metal ions, divalent metal ions such as magnesium, calcium, zinc, barium, cadmium or the like are preferable. Use of the divalent metal salt of the α,β-unsaturated carboxylic acid having 3 to 8 carbon atoms easily generates a metal crosslinking between the rubber molecules. Especially, in light of the better resilience of the resultant golf ball, as the divalent metal salt, the zinc salt of the α,β-unsaturated carboxylic acid having 3 to 8 carbon atoms is preferable, and zinc acrylate is more preferable. The α,β-unsaturated carboxylic acid having 3 to 8 carbon atoms and/or the metal salt thereof may be used solely or in combination at least two of them.

The content of (b) the co-crosslinking agent is preferably 15 parts by mass or more, more preferably 20 parts by mass or more, and is preferably 50 parts by mass or less, more preferably 45 parts by mass or less, even more preferably 40 parts by mass or less, with respect to 100 parts by mass of (a) the base rubber. If the content of (b) the co-crosslinking agent is less than 15 parts by mass, the content of (c) the crosslinking initiator which will be explained below must be increased in order to obtain the appropriate hardness of the constituting member formed from the core rubber composition, which tends to cause the lower resilience of the golf ball. On the other hand, if the content of (b) the co-crosslinking agent exceeds 50 parts by mass, the constituting member formed from the core rubber composition becomes excessively hard, which tends to cause the lower shot feeling of the golf ball.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely, or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the core rubber composition becomes so soft that the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the core rubber composition, resulting in the insufficient resilience and lower durability of the golf ball.

The core rubber composition may further contain (d) a carboxylic acid and/or a salt thereof. By containing (d) the carboxylic acid and/or the salt thereof, the obtained spherical core has a higher degree of the outer-hard inner-soft structure. Examples of (d) the carboxylic acid and/or the salt thereof include an aliphatic carboxylic acid, a salt of an aliphatic carboxylic acid, an aromatic carboxylic acid and a salt of an aromatic carboxylic acid. (d) The carboxylic acid and/or the salt thereof may be used solely or as a mixture of at least two kinds.

The aliphatic carboxylic acid may be a saturated aliphatic carboxylic acid (hereinafter, sometimes referred to as "saturated fatty acid") or an unsaturated aliphatic carboxylic acid (hereinafter, sometimes referred to as "unsaturated fatty acid"). Further, the aliphatic carboxylic acid may have a branched structure or cyclic structure. The saturated fatty acid preferably has 1 or more carbon atom, and preferably has 30 or less carbon atoms, more preferably has 18 or less carbon atoms, even more preferably has 13 or less carbon atoms. The unsaturated fatty acid preferably has 5 or more carbon atoms, more preferably has 7 or more carbon atoms, even more preferably has 9 or more carbon atoms, and preferably has 30 or less carbon atoms, more preferably has 18 or less carbon atoms, even more preferably has 13 or less carbon atoms. It is noted that (d) the aliphatic carboxylic acid and/or the salt thereof does not include (b) the $\alpha,\beta$-unsaturated carboxylic acid having 3 to 8 carbon atoms and the metal salt thereof used as the co-crosslinking agent.

Examples of the aromatic carboxylic acid include a carboxylic acid having a benzene ring in the molecule thereof and a carboxylic acid having a heteroaromatic ring in the molecule thereof. The aromatic carboxylic acid may be used solely, or at least two kinds of the aromatic carboxylic acids may be used in combination. Examples of the carboxylic acid having a benzene ring include an aromatic carboxylic acid having a carboxyl group directly bonding to the benzene ring, an aromatic-aliphatic carboxylic acid having an aliphatic carboxylic acid bonding to the benzene ring, a polynuclear aromatic carboxylic acid having a carboxyl group directly bonding to fused benzene rings, a polynuclear aromatic-aliphatic carboxylic acid having an aliphatic carboxylic acid bonding to fused benzene rings. Examples of the carboxylic acid having a heteroaromatic ring include a carboxyl group having a carboxyl group directly bonding to a heteroaromatic ring.

As (d) the salt of the aliphatic carboxylic acid or the salt of the aromatic carboxylic acid, the salt of the above aliphatic carboxylic acid or aromatic carboxylic acid may be used. The cation component of the salt may be a metal ion, an ammonium ion or an organic cation. The metal ion includes, for example, monovalent metal ions such as sodium, potassium, lithium, silver, and the like; bivalent metal ions such as magnesium, calcium, zinc, barium, cadmium, copper, cobalt, nickel, manganese, and the like; trivalent metal ions such as aluminum and iron, and other ions such as tin, zirconium, titanium, and the like. These cation components may be used alone or as a mixture of at least two of them.

The organic cation is a cation having a carbon chain. The organic cation includes, for example, without limitation, an organic ammonium ion. Examples of the organic ammonium ion are: primary ammonium ions such as stearyl ammonium ion, hexyl ammonium ion, octyl ammonium ion, 2-ethyl hexyl ammonium ion, and the like; secondary ammonium ions such as dodecyl (lauryl) ammonium ion, octadecyl (stearyl) ammonium ion, and the like; tertiary ammonium ions such as trioctyl ammonium ion, and the like; and quaternary ammonium ion such as dioctyldimethyl ammonium ion, distearyldimethyl ammonium ion, and the like. These organic cations may be used alone or as a mixture of at least two of them.

As (d) the aliphatic carboxylic acid and/or the salt thereof, a saturated fatty acid and/or a salt thereof are preferable. Caprylic acid (octanoic acid), pelargonic acid (nonanoic acid), capric acid (decanoic acid), lauric acid, myristic acid, palmitic acid, stearic acid, behenic acid, oleic acid, or their potassium salt, magnesium salt, calcium salt, aluminum salt, zinc salt, iron salt, copper salt, nickel salt, and cobalt salt are preferable. As (d) the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, anthracene carboxylic acid, furan carboxylic acid, thenoic acid, or their potassium salt, magnesium salt, calcium salt, aluminum salt, zinc salt, iron salt, copper salt, nickel salt, and cobalt salt are particularly preferable.

The content of (d) the carboxylic acid and/or the salt thereof, for example, is preferably 0.5 part by mass or more, more preferably 1.0 part by mass or more, even more preferably 1.5 parts by mass or more, and is preferably 40 parts by mass or less, more preferably 35 parts by mass or less, even more preferably 30 parts by mass or less, with respect to 100 parts by mass of (a) the base rubber. If the content of (d) the carboxylic acid and/or the salt thereof is 0.5 part by mass or more, the spherical core has a higher degree of the outer-hard inner-soft structure, and if the content of (d) the carboxylic acid and/or the salt thereof is 40 parts by mass or less, the resilience of the core becomes better since the decrease in hardness of the core may be inhibited.

In addition, there are cases where the surface of the compound used as the co-crosslinking agent is treated with zinc stearate or the like to improve the dispersibility thereof to the rubber. In the case of using such co-crosslinking agent whose surface is treated with zinc stearate or the like, in the present invention, the amount of zinc stearate or the like used as a surface treating agent is included in the content of (d) the carboxylic acid and/or the salt thereof. For example, if 25 parts by mass of zinc acrylate containing zinc stearate in a surface treatment amount of 10 mass % is used, the amount of zinc stearate is 2.5 parts by mass and the amount of zinc acrylate is 22.5 parts by mass. Thus, 2.5 parts by mass is counted as the content of (d) the carboxylic acid and/or the salt thereof.

When (d) the carboxylic acid and/or the salt thereof is used, the metal salt of the $\alpha,\beta$-unsaturated carboxylic acid having 3 to 8 carbon atoms is preferably used as the co-crosslinking agent. When (d) the carboxylic acid and/or the salt thereof is used, if the $\alpha,\beta$-unsaturated carboxylic acid having 3 to 8 carbon atoms is used as the co-crosslinking agent, the core rubber composition preferably further contains (e) a metal compound.

(e) The metal compound is not particularly limited as long as it can neutralize (b) the $\alpha,\beta$-unsaturated carboxylic acid having 3 to 8 carbon atoms in the rubber composition. (e) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (e) the metal compound preferably includes a divalent metal compound, more preferably includes a zinc compound. The divalent metal compound reacts with the $\alpha,\beta$-unsaturated carboxylic acid having 3 to 8 carbon atoms, thereby forming a metal crosslinking. Use of the zinc compound provides a golf ball with excellent resilience. Use of the zinc compound provides a golf ball with excellent resilience. (d) These metal compounds can be used solely or as a mixture of at least two of them.

The core rubber composition preferably further contains (f) an organic sulfur compound. By containing (f) the organic sulfur compound, the obtained spherical core has better resilience. (f) The organic sulfur compound includes, for example, thiophenols, thionaphthols, polysulfides, thiurams, thiocarboxylic acids, dithiocarboxylic acids, sulfenamides, dithiocarbamates, and thiazoles. In light of increasing the hardness distribution of the spherical core, (f) the organic sulfur compound preferably includes an organic compound having a thiol group (—SH) or a metal salt thereof, and thiophenols, thionaphthols or their metal salts.

(f) These organic sulfur compounds can be used solely or as a mixture of at least two of them.

As (f) the organic sulfur compound, the thiophenols and/or the metal salts thereof, the thionaphthols and/or the metal salts thereof, diphenyldisulfides, and thiuramdisulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, pentabromothiophenol, 1-thionaphthol, 2-thionaphthol, diphenyldisulfide, bis(2,6-difluorophenyl) disulfide, bis(2,6-dichlorophenyl)disulfide, bis(2,6-dibromophenyl)disulfide, bis(2,6-diiodophenyl)disulfide, and bis (pentabromophenyl)disulfide are more preferable.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is 0.05 part by mass or more, the resilience of the resultant golf ball further increases. If the content of (f) the organic sulfur compound is 5.0 parts by mass or less, the compression deformation amount of the obtained golf ball does not become excessively large, thus the decrease in resilience may be inhibited.

The core rubber composition used in the present invention may further include additives such as a pigment, a filler for adjusting weight or the like, an antioxidant (for example, 2,5-di-t-butylhydroquinone), a peptizing agent, and a softener, where necessary.

Examples of the pigment blended in the core rubber composition include a white pigment, a blue pigment, and a purple pigment. As the white pigment, titanium oxide is preferably used. The type of titanium oxide is not particularly limited, but rutile type is preferably used because of the high opacity. The content of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the core rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The content of the blue pigment is preferably 0.001 part by mass or more, more preferably 0.05 part by mass or more, and is preferably 0.2 part by mass or less, and more preferably 0.1 part by mass or less, with respect to 100 parts by mass of (a) the base rubber. If the content of the blue pigment is less than 0.001 part by mass, blueness is insufficient, and the color looks yellowish. If the content of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes inorganic fillers such as barium sulfate, calcium carbonate, magnesium oxide, tungsten powder, molybdenum powder, or the like. The content of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the content of the filler is less than 0.5 part by mass, it is difficult to adjust the weight, while if the content of the filler exceeds 30 parts by mass, the weight ratio of the rubber component is reduced, thus the resilience tends to be lowered.

The content of the antioxidant is preferably 0.1 part by mass or more and 1 part by mass or less with respect to 100 parts by mass of (a) the base rubber. In addition, the content of the peptizing agent is preferably 0.1 part by mass or more and 5 parts by mass or less with respect to 100 parts by mass of (a) the base rubber.

The core rubber composition used in the present invention contains (x) the crosslinked rubber powder. As (x) the crosslinked rubber powder, one kind of a powder or at least two kinds of powder may be used. The particle shape of (x) the crosslinked rubber powder is not particularly limited. (x) The crosslinked rubber powder used in the present invention contains (x1) the soft particles in a predetermined amount. Blending (x1) the soft particles which have a sufficiently lower hardness than the surface hardness (Hs) of the spherical core and the hardness (Hs5) at 5 mm point inside the surface of the spherical core improves the durability of the obtained spherical core while maintaining the resilience and shot feeling of the obtained spherical core. It is noted that the crosslinked rubber is a rubber where chain rubber molecules are crosslinked to form a three dimensional net structure such that no plastic deformation occurs. The crosslinking of chain rubber molecules can be carried out by using a co-crosslinking agent, an organic peroxide, sulfur and the like.

The particle hardness (Hp) of (x1) the soft particles is preferably 18 or more, more preferably 20 or more, and is preferably 65 or less, more preferably 60 or less, even more preferably 58 or less in JIS-C hardness. If the particle hardness (Hp) of (x1) the soft particles is 18 or more in JIS-C hardness, since (x1) the soft particles are difficult to dissolve in the matrix material when kneading because of high crosslinking, the durability improvement effect further increases. If the particle hardness (Hp) of (x1) the soft particles is 65 or less in JIS-C hardness, the hardness difference between the particle hardness Hp and the surface hardness Hs of the spherical core, and the hardness difference between the particle hardness Hp and the hardness Hs5 at 5 mm point inside the surface of the spherical core become large, thus the durability improvement effect further increases.

The volume average particle size of (x1) the soft particles is preferably 200 μm or more, more preferably 300 μm or more, even more preferably 400 μm or more, and is preferably 800 μm or less, more preferably 750 μm or less, even more preferably 700 μm or less. If the volume average particle size of (x1) the soft particles is 200 μm or more, recrosslinking of (x1) the soft particles when molding the core may be suppressed. If the volume average particle size of (x1) the soft particles is 800 μm or less, (x1) the soft particles are easy to disperse in the matrix material. In addition, when (x) the crosslinked rubber powder is prepared by pulverizing a rubber material (such as the golf ball core) having a hardness distribution, the particles corresponding to (x1) the soft particles are prepared to mix with other particles. In this case, the volume average particle size of (x) the crosslinked rubber powder can be deemed as the volume average particle size of (x1) the soft particles, since (x1) the soft particles and other particles are pulverized at the same conditions.

(x) The crosslinked rubber powder is preferably formed from a rubber composition containing (a1)) a base rubber, (b1) a co-crosslinking agent and (c1) a crosslinking initiator.

Examples of (a1) the base rubber include (a) the base rubber used in the above core rubber composition. Polybutadiene rubber, natural rubber, polyisoprene rubber, styrene polybutadiene rubber, and ethylene-propylene-diene rubber (EPDM) are preferable.

Examples of (b1) the co-crosslinking agent include (b) the co-crosslinking agent used in the above core rubber composition. As (b1) the co-crosslinking agent, the zinc salt of the α,β-unsaturated carboxylic acid having 3 to 8 carbon atoms is preferable, zinc acrylate and zinc methacrylate are more preferable.

Examples of (c1) the crosslinking initiator include (c) the crosslinking initiator used in the above core rubber composition. Dicumyl peroxide, 1,1-bis(t-butylperoxy)-3,3,5-trimethylcyclohexane, 2,5-dimethyl-2,5-di(t-butylperoxy) hexane, and di-t-butyl peroxide are preferable.

The rubber composition used for manufacturing (x) the crosslinked rubber powder may further contains (f1) an organic sulfur compound. Examples of (f1) the organic sulfur compound include (f) the organic sulfur compound used in the above core rubber composition. Preferred are 2-thionaphthol, diphenyldisulfide, 2,6-dichlorothiophenol, 2,6-dibromothiophenol, pentachlorothiophenol, and pentabromothiophenol.

The rubber composition used for manufacturing (x) the crosslinked rubber powder may further include additives such as a pigment, a filler for adjusting weight or the like, an antioxidant (for example, 2,5-di-t-butylhydroquinone), a peptizing agent, and a softener. In addition, the rubber composition may contain a rubber powder obtained by pulverizing a golf ball core or offcuts produced when preparing a core.

(x) The crosslinked rubber powder can be obtained by pulverizing or grinding a rubber sheet which is prepared from the rubber composition. In addition, (x) the crosslinked rubber powder can be obtained by pulverizing or grinding a golf ball core or offcuts produced when preparing a core. When (x) the crosslinked rubber powder is obtained by pulverizing a rubber material (such as a golf ball core) having a hardness distribution, the content of (x1) the soft particles in (x) the crosslinked rubber powder can be calculated from the hardness distribution of the rubber material used for manufacturing the crosslinked rubber powder.

The content of (x1) the soft particles is preferably 2.1 parts by mass or more, more preferably 3 parts by mass or more, even more preferably 4 parts by mass or more, and is preferably 30 parts by mass or less, more preferably 25 parts by mass or less, even more preferably 20 parts by mass or less, with respect to 100 parts by mass of (a) the base rubber. If the content of (x1) the soft particles is 2.1 parts by mass or more, the durability improvement effect due to the blending of (x1) the soft particles further increases, and if the content of (x1) the soft particles is 30 parts by mass or less, the decrease in resilience of the spherical core can be inhibited.

The core rubber composition used in the present invention is obtained by mixing and kneading (a) the base rubber, (b) the co-crosslinking agent, (c) the crosslinking initiator, (x) the crosslinked rubber powder, and other additives where necessary. The kneading can be conducted, without any limitation, with a well-known kneading machine such as a kneading roll, a banbury mixer, a kneader, or the like.

The spherical core of the golf ball of the present invention can be obtained by molding the rubber composition after kneaded in a mold. The temperature for molding the rubber composition into the spherical core is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

The golf ball cover of the present invention is formed from a cover composition containing a resin component. Examples of the resin component include, for example, an ionomer resin; a thermoplastic polyurethane elastomer having a commercial name of "Elastollan (registered trademark)" commercially available from BASF Japan Ltd; a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; and a thermoplastic styrene elastomer having a commercial name of "Rabalon (registered trademark)" commercially available from Mitsubishi Chemical Corporation; and the like.

The ionomer resin includes a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion; and a mixture of those. The olefin preferably includes an olefin having 2 to 8 carbon atoms. Examples of the olefin are ethylene, propylene, butene, pentene, hexene, heptene, and octene. The olefin particularly preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes the metal ion-neutralized product of the ethylene-(meth) acrylic acid binary copolymer and the metal ion-neutralized product of the ethylene-(meth) acrylic acid-(meth) acrylic acid ester ternary copolymer.

Specific examples of the ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM 3711 (Mg); and the ternary copolymer ionomer resin such as Himilan 1856 (Na) and Himilan 1855 (Zn))" commercially available from Du Pont-Mitsui Polychemicals Co., Ltd.

Further, examples of the ionomer resin commercially available from E.I. du Pont de Nemours and Company include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymer ionomer resin such as Surlyn 8120 (Na), Surlyn 8320 (Na), Surlyn 9320 (Zn), Surlyn 6320 (Mg), HPF 1000 (Mg), and HPF 2000 (Mg))"

Further, examples of the ionomer resin commercially available from ExxonMobil Chemical Corporation include "Iotek (registered trademark) (e.g. Iotek 8000 (Na), Iotek 8030 (Na), Iotek 7010 (Zn), Iotek 7030 (Zn); and the ternary copolymer ionomer resin such as Iotek 7510 (Zn) and Iotek 7520 (Zn))".

It is noted that Na, Zn, Li, and Mg described in the parentheses after the trade names of the ionomer resin indicate metal ion type for neutralizing the ionomer resin. The ionomer resin may be used solely or in combination at least two of them.

The cover composition constituting the cover of the golf ball of the present invention preferably includes, as a resin component, a thermoplastic polyurethane elastomer or an ionomer resin. In the case of using the ionomer resin, it is preferred to use a thermoplastic styrene elastomer together. The content of the polyurethane or ionomer resin in the resin component of the cover composition is preferably 50 mass % or more, more preferably 60 mass % or more, and even more preferably 70 mass % or more.

The cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover, in addition to the above resin component.

The content of the white pigment (for example, titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the content of the white pigment is 0.5 part by mass or more, it is possible to impart the opacity to the resultant cover. Further, if the content of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in Shore D hardness. If the cover composition has a slab hardness of 50 or more, the obtained golf ball has a high launch angle and low spin rate on driver shots and iron shots, and thus the flight distance becomes great. If the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more in Shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. If the cover composition has a slab hardness of 20 or more, the abrasion resistance improves. In case of a plurality of cover layers, the slab hardness of the cover composition constituting each layer can be identical or different, as long as the slab hardness of each layer is within the above range.

An embodiment for molding the cover of the golf ball of the present invention includes, for example, an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a hollow half shell, covering the core with the two hollow half shells, and subjecting the core with the two hollow half shells to the compression-molding); or an embodiment which comprises injection-molding the cover composition directly onto the core.

When molding the cover in a compression-molding method, the molding of the half shell can be performed by either a compression-molding method or an injection-molding method, but the compression-molding method is preferred. The compression-molding of the cover composition into a half shell can be carried out, for example, under a pressure of 1 MPa or more and 20 MPa or less at a molding temperature of −20° C. or more and 70° C. or less relative to the flow beginning temperature of the cover composition. By performing the molding under the above conditions, a half shell having a uniform thickness can be formed. Examples of the method for molding the cover using a half shell include a method of covering the core with the two half shells and then subjecting the core with the two half shells to the compression-molding. The compression-molding of the half shells into the cover can be carried out, for example, under a molding pressure of 0.5 MPa or more and 25 MPa or less at a molding temperature of −20° C. or more and 70° C. or less relative to the flow beginning temperature of the cover composition. By performing the molding under the above conditions, a golf ball cover having a uniform thickness can be formed.

In the case of injection-molding the cover composition into the cover, the cover composition extruded in a pellet form may be used for injection-molding, or the cover materials such as the base resin component and the pigment may be dry blended, followed by directly injection-molding the blended material. It is preferred to use upper and lower molds having a hemispherical cavity and pimples for forming the cover, wherein a part of the pimples also serves as a retractable hold pin. When molding the cover by injection-molding, the hold pin is protruded to hold the core, and the cover composition is charged and then cooled to obtain the cover. For example, the cover composition which has been heated to a temperature ranging from 200° C. to 250° C. is charged into a mold held under a pressure of 9 MPa to 15 MPa for 0.5 second to 5 seconds, and after cooling for 10 seconds to 60 seconds, the mold is opened to obtain the golf ball with the cover.

The concave portions called "dimple" are usually formed on the surface of the cover. The total number of the dimples is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the dimples includes, for example, without limitation, a circle, a polygonal shape such as a roughly triangular shape, a roughly quadrangular shape, a roughly pentagonal shape, a roughly hexagonal shape, and another irregular shape. The shape of the dimples may be employed solely or at least two of them may be used in combination.

The thickness of the cover is preferably 4.0 mm or less, more preferably 3.0 mm or less, even more preferably 2.0 mm or less. If the thickness of the cover is 4.0 mm or less, the resilience and the shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

The golf body on which the cover has been molded is ejected from the mold, and as necessary, the golf ball body is preferably subjected to surface treatments such as deburring, cleaning, and sandblast. If desired, a paint film or a mark may be formed thereon. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness of the paint film is smaller than 5 μm, the paint film is easy to wear off due to continued use of the golf ball, and if the thickness of the paint film is larger than 50 μm, the effect of the dimples is reduced, resulting in lowering flying performance of the golf ball.

When the golf ball of the present invention has a diameter in a range from 40 mm to 45 mm, a compression deformation amount (a shrinking amount of the golf ball in the compression direction thereof) of the golf ball when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, thus exhibits good shot feeling. On the other hand, if the compression deformation amount is 5.0 mm or less, the resilience is enhanced.

The golf ball construction of the present invention is not limited, as long as the golf ball comprises a spherical core and at least one cover layer covering the spherical core. FIG. 1 is a partially cutaway sectional view showing the golf ball 2 according to one embodiment of the present invention. The golf ball 2 comprises a spherical core 4, and a cover 12 covering the spherical core 4. A plurality of dimples 14 are formed on the surface of the cover. Other portions than dimples 14 on the surface of the golf ball 2 are land 16. The golf ball 2 is provided with a paint layer and a mark layer outside the cover 12, but these layers are not depicted.

The spherical core preferably has a single layered structure. Unlike a multi-layered structure, the spherical core of the single layered structure does not have an energy loss at the interface of the multi-layered structure when being hit, and thus has an improved resilience. The cover has a structure of at least one layer, for example a single layered structure, or a multi-layered structure of at least two layers. The golf ball of the present invention includes, for example, a two-piece golf ball comprising a spherical core and a single layered cover disposed around the spherical core; a multi-piece golf ball comprising a spherical core and at least two cover layers disposed around the spherical core (including a three-piece golf ball); and a wound golf ball comprising a spherical core, a rubber thread layer which is formed around the spherical core, and a cover disposed over the rubber thread layer. The present invention can be suitably applied to any one of the above golf ball.

EXAMPLES

Hereinafter, the present invention will be described in detail by way of examples. The present invention is not limited to the examples described below. Various changes and modifications can be made without departing from the spirit and scope of the present invention.

[Evaluation Methods]

(1) Hardness of Crosslinked Rubber Powder (JIS-C Hardness)

Three or more of rubber sheets (each sheet has a thickness of 2 mm) used for preparing the rubber powder were stacked on one another, and the hardness of the stack was measured with a type P1 auto loading durometer manufactured by Kobunshi Keiki Co., Ltd., provided with a JIS-C type spring hardness tester prescribed in ASTM-D2240.

(2) Average Particle Size of Crosslinked Rubber Powder

The laser diffraction/scattering type particle size distribution analyzer (LMS-2000e, available from Seishin Enterprise Co., Ltd) was used to measure the volume based average particle size.

(3) Hardness Distribution of Core (JIS-C Hardness)

A type P1 auto loading durometer manufactured by Kobunshi Keiki Co., Ltd., provided with a JIS-C type spring hardness tester was used to measure the hardness of the core. The JIS-C hardness measured at the core surface was adopted as the surface hardness of the core. The core was cut into two hemispheres to obtain a cut plane, and the hardness at the central point thereof and the hardness at predetermined distances from the central point were measured. The core hardness was measured at 4 points at a predetermined distance from the central point of the cut plane of the core. The core hardness was calculated by averaging the hardness measured at 4 points.

(4) Compression Deformation Amount (mm)

The compression deformation amount of the core or golf ball (shrinking amount of the core or golf ball in the compression direction thereof), when applying a load from an initial load of 98 N to a final load of 1275 N to the core or golf ball, was measured.

(5) Coefficient of Restitution

A 200 g of aluminum cylindrical object was allowed to collide with the core or golf ball at a speed of 40 m/sec, and the speeds of the cylindrical object and the core or golf ball after the collision were measured. Based on the speeds before and after the collision and the mass of each object, coefficient of restitution was calculated. This measurement was conducted twelve times for each core or golf ball, and the average value thereof was calculated. A greater value indicates that the resilience is excellent.

Coefficient of restitution=(speed of core or golf ball after collision−speed of cylindrical object after collision)/(speed of cylindrical object before collision−speed of core or golf ball before collision)

(6) Slab Hardness (Shore D Hardness) Sheets with a thickness of about 2 mm were produced by injection molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(7) Durability

A metal-head W#1 club (driver) was installed on a swing robot manufactured by TRUETEMPER CO, the head speed was set to 45 m/sec, and each golf ball was hit to collide with a collision plate for evaluation. The evaluation criteria is that, the number of hits required to break the golf ball was counted, the number of hits for the golf ball No. 4 was defined as an index of 100, and the durability of each golf ball was represented by converting the number of hits for each golf ball into this index. A greater index indicates that the durability of the golf ball is excellent.

(8) Spin Rate (rpm) on Driver Shots

A metal-headed W#1 driver (XXIO, Shaft: S, loft: 11°, manufactured by Dunlop Sports Limited) was installed on a swing robot M/C manufactured by Golf Laboratories, Inc. The golf ball was hit at a head speed of 40 m/sec, and the spin rate right after hitting the golf ball was measured. This measurement was conducted twelve times for each golf ball, and the average value thereof was adopted as the measurement value for the golf ball. A sequence of photographs of the hit golf ball were taken for measuring the spin rate right after hitting the golf ball. The spin rate on driver shots is shown as the difference from that of the golf ball No. 5.

[Preparation of Crosslinked Rubber Powder]

The rubber compositions having the formulation shown in Table 1 was kneaded with a kneading roll, and then heated at 170° C. for 20 minutes to obtain a rubber sheet (thickness: 2 mm). The obtained rubber sheet was pulverized using a frozen pulverizer to obtain the crosslinked rubber powder. The obtained rubber sheet has a uniform hardness.

TABLE 1

| | Crosslinked rubber powder No. | 1 | 2 | 3 | 4 | 5 | 6 | 7 |
|---|---|---|---|---|---|---|---|---|
| Formulation (part by mass) | BR-730 | 100 | 100 | 100 | — | 100 | 100 | 100 |
| | BR-11 | — | — | — | 67 | — | — | — |
| | BR-10 | — | — | — | 33 | — | — | — |
| | Zinc acrylate | 28 | 15 | 22 | — | 2 | 28 | 28 |
| | Methacrylic acid | — | — | 20 | 20 | — | — | — |
| | Zinc oxide | 5 | 5 | — | 23 | 5 | 5 | 5 |
| | Barium sulfate | 10 | 10 | — | — | 10 | 10 | 10 |
| | Calcium carbonate | — | — | 5 | — | — | — | — |
| | Dicumyl peroxide | 0.16 | 0.16 | 1.6 | 1.5 | 0.16 | 0.16 | 0.16 |
| | Thionaphthol | 0.2 | 0.2 | — | — | 0.2 | 0.2 | 0.2 |
| | 2,5-di-t-butylhydroquinone | — | — | 0.2 | 0.5 | — | — | — |
| | Rubber powder | 5 | 5 | — | — | 5 | 5 | 5 |
| Property | Hardness Hp (JIS-C hardness) | 57.3 | 39.7 | 70.0 | 70.0 | 17.8 | 57.3 | 57.3 |
| | Volume average particle size (μm) | 640 | 640 | 640 | 640 | 640 | 200 | 1070 |

BR-730: "BR-730 (high-cis polybutadiene (cis-1,4 bond content = 96 mass %, 1,2-vinyl bond content = 1.3 mass %, Moony viscosity ($ML_{1+4}$ (100° C.) = 55, molecular weight distribution (Mw/Mn) = 3))" available from JSR Corporation
BR-11: "BR-11 (polybutadiene (cis-1,4 bond content = 95.6 mass %, Moony viscosity ($ML_{1+4}$ (100° C.) = 43.5))" available from JSR Corporation
BR-10: "BR-10 (polybutadiene (cis-1,4 bond content = 94.6 mass %, Moony viscosity ($ML_{1+4}$ (100° C.) = 27.5))" available from JSR Corporation
Zinc acrylate: "ZN-DA90S" available from Nippon Shokubai Co., Ltd.
Methacrylic acid: available from Mitsubishi Gas Chemical Company
Zinc oxide: "Ginrei R" available from Toho Zinc Co., Ltd.
Barium sulfate: "Barium sulfate BD" available from Sakai Chemical Industry Co., Ltd.
Calcium carbonate: available from Wako Pure Chemical Industries, Ltd. (special grade chemical)
Dicumyl peroxide: "PERCUMYL (registered trademark) D" available from NOF Corporation
Thionaphthol: available from Tokyo Chemical Industry Co., Ltd. (2-thionaphtol)
2,5-di-t-butylhydroquinone: available from Wako Pure Chemical Industries, Ltd. (Wako special grade chemical)
Rubber powder: the powder obtained by pulverizing the golf ball core formed from the rubber composition

[Production of Golf Ball]

(1) Production of Core

The rubber compositions having the formulations shown in Tables 2 and 3 were kneaded with a kneading roll, and then heat-pressed in upper and lower molds, each having a hemispherical cavity, at 170° C. for 20 minutes to prepare the spherical cores having a diameter of 40.0 mm and a mass of 45.0 g.

TABLE 2

| | Golf ball No. | 1 | 2 | 3 | 4 | 5 | 6 | 7 | 8 |
|---|---|---|---|---|---|---|---|---|---|
| Rubber composition (part by mass) | BR-730 | 100 | 100 | 100 | 100 | 100 | — | 100 | 100 |
| | BR-11 | — | — | — | — | — | 67 | — | — |
| | BR-10 | — | — | — | — | — | 33 | — | — |
| | Zinc acrylate | 31 | 31 | 30 | 31 | — | — | 30 | 30 |
| | Methacrylic acid | — | — | — | — | 20 | 20 | — | — |
| | Zinc oxide | 5 | 5 | 5 | 5 | 23 | 23 | 5 | 5 |
| | Barium sulfate | 14.6 | 14.6 | 14.6 | 14.6 | — | — | 14.6 | 14.6 |
| | Dicumyl peroxide | 0.8 | 0.8 | 0.8 | 0.8 | 1.5 | 1.5 | 0.8 | 0.8 |
| | 2-Thionaphthol | 0.2 | 0.2 | 0.2 | 0.2 | — | — | 0.2 | 0.2 |
| | Benzoic acid | 5.2 | 5.2 | 5.2 | 5.2 | — | — | 5.2 | 5.2 |
| | Zinc octanoate | — | — | — | — | — | — | — | — |
| | Zinc stearate | — | — | — | — | — | — | — | — |
| | 2,5-di-t-butylhydroquinone | — | — | — | — | 0.5 | 0.5 | — | — |
| | Crosslinked rubber powder No. 1 (JIS-C: 57.3) | 5 | 5 | — | — | — | — | — | — |
| | Crosslinked rubber powder No. 2 (JIS-C: 39.7) | — | — | 5 | — | — | — | — | — |
| | Crosslinked rubber powder No. 3 (JIS-C: 70.0) | — | — | — | — | 10 | — | — | — |
| | Crosslinked rubber powder No. 4 (JIS-C: 70.0) | — | — | — | — | — | 40 | — | — |
| | Crosslinked rubber powder No. 5 (JIS-C: 17.8) | — | — | — | — | — | — | 5 | — |

TABLE 2-continued

| | Golf ball No. | 1 | 2 | 3 | 4 | 5 | 6 | 7 | 8 |
|---|---|---|---|---|---|---|---|---|---|
| Core | Crosslinked rubber powder No. 6 (JIS-C: 57.3) | — | — | — | — | — | — | — | 5 |
| | Crosslinked rubber powder No. 7 (JIS-C: 57.3) | — | — | — | — | — | — | — | — |
| | Crosslinked rubber powder No. 8 | — | 5 | 5 | 5 | — | — | 5 | 5 |
| | Hardness Center hardness Ho | 46.9 | 51.6 | 50.2 | 46.3 | 62.0 | 63.0 | 50.7 | 48.4 |
| | distribution 2.5 mm point hardness | 49.6 | 54.2 | 52.9 | 49.3 | 63.8 | 63.7 | 53.2 | 53.0 |
| | (JIS-C) 5.0 mm point hardness | 53.0 | 56.8 | 56.0 | 52.4 | 64.5 | 64.5 | 56.4 | 56.8 |
| | 7.5 mm point hardness | 55.3 | 58.8 | 58.7 | 55.3 | 64.9 | 64.7 | 58.0 | 58.0 |
| | 10.0 mm point hardness | 58.6 | 63.9 | 63.8 | 59.2 | 67.0 | 66.8 | 62.4 | 65.3 |
| | 12.5 mm point hardness | 68.9 | 75.7 | 75.1 | 71.0 | 70.1 | 69.9 | 73.8 | 76.5 |
| | 15.0 mm point hardness Hs5 | 76.8 | 80.4 | 80.5 | 77.1 | 72.7 | 72.8 | 81.1 | 80.5 |
| | Surface hardness Hs | 85.8 | 84.7 | 82.1 | 85.5 | 76.2 | 76.4 | 82.6 | 79.8 |
| | Hardness difference (Hs − Ho) | 39.0 | 33.1 | 31.9 | 39.2 | 14.2 | 13.4 | 31.9 | 31.4 |
| | Compression deformation amount (mm) | 3.1 | 2.9 | 3.1 | 3.0 | 3.6 | 3.6 | 3.0 | 3.1 |
| | Coefficient of restitution | 0.783 | 0.785 | 0.781 | 0.783 | 0.727 | 0.728 | 0.787 | 0.789 |
| Cover | Slab hardness (Shore D) | 65 | 65 | 65 | 65 | 65 | 65 | 65 | 65 |
| | Thickness (mm) | 1.5 | 1.5 | 1.5 | 1.5 | 1.5 | 1.5 | 1.5 | 1.5 |
| Ball | Compression deformation amount (mm) | 2.7 | 2.6 | 2.7 | 2.6 | 3.3 | 3.6 | 2.6 | 2.7 |
| | Coefficient of restitution | 0.793 | 0.796 | 0.794 | 0.796 | 0.730 | 0.731 | 0.790 | 0.792 |
| | Durability | 116 | 114 | 119 | 100 | 250 | 250 | 100 | 112 |
| | Driver spin rate (rpm) | −90 | −70 | −70 | −90 | 0 | 0 | −70 | −70 |

TABLE 3

| | Golf ball No. | 9 | 10 | 11 | 12 | 13 | 14 | 15 | 16 |
|---|---|---|---|---|---|---|---|---|---|
| Rubber composition (part by mass) | BR-730 | 100 | 100 | 100 | 100 | 100 | 100 | 100 | 100 |
| | BR-11 | — | — | — | — | — | — | — | — |
| | BR-10 | — | — | — | — | — | — | — | — |
| | Zinc acrylate | 30 | 30 | 30 | 31 | 37 | 37 | 29 | 29 |
| | Methacrylic acid | — | — | — | — | — | — | — | — |
| | Zinc oxide | 5 | 5 | 5 | 5 | 5 | 5 | 5 | 5 |
| | Barium sulfate | 14.6 | 14.6 | 14.6 | 14.6 | — | — | — | — |
| | Dicumyl peroxide | 0.8 | 0.8 | 0.8 | 0.8 | 0.8 | 0.8 | 0.8 | 0.8 |
| | 2-Thionaphthol | 0.2 | 0.2 | 0.2 | 0.2 | 0.2 | 0.2 | 0.2 | 0.2 |
| | Benzoic acid | 5.2 | 5.2 | 5.2 | 5.2 | — | — | — | — |
| | Zinc octanoate | — | — | — | — | 5 | 5 | — | — |
| | Zinc stearate | — | — | — | — | — | — | 10 | 10 |
| | 2,5-di-t-butylhydroquinone | — | — | — | — | — | — | — | — |
| | Crosslinked rubber powder No. 1 (JIS-C: 57.3) | — | 2 | 10 | 20 | 5 | — | 5 | — |
| | Crosslinked rubber powder No. 2 (JIS-C: 39.7) | — | — | — | — | — | — | — | — |
| | Crosslinked rubber powder No. 3 (JIS-C: 70.0) | — | — | — | — | — | — | — | — |
| | Crosslinked rubber powder No. 4 (JIS-C: 70.0) | — | — | — | — | — | — | — | — |
| | Crosslinked rubber powder No. 5 (JIS-C: 17.8) | — | — | — | — | — | — | — | — |
| | Crosslinked rubber powder No. 6 (JIS-C: 57.3) | — | — | — | — | — | — | — | — |
| | Crosslinked rubber powder No. 7 (JIS-C: 57.3) | 5 | — | — | — | — | — | — | — |
| | Crosslinked rubber powder No. 8 | 5 | 5 | 5 | 5 | — | — | — | — |
| Core | Hardness Center hardness Ho | 48.6 | 46.7 | 49.2 | 46.7 | 49.1 | 49.3 | 49.7 | 49.9 |
| | distribution 2.5 mm point hardness | 52.5 | 50.7 | 52.8 | 51.4 | 58.2 | 58.2 | 53.6 | 53.6 |
| | (JIS-C) 5.0 mm point hardness | 55.4 | 54.5 | 55.9 | 55.0 | 65.9 | 65.8 | 58.5 | 58.4 |
| | 7.5 mm point hardness | 57.8 | 56.8 | 58.9 | 56.8 | 68.7 | 68.9 | 62.4 | 62.4 |
| | 10.0 mm point hardness | 64.4 | 63.1 | 67.3 | 64.1 | 70.0 | 70.0 | 63.8 | 64.0 |
| | 12.5 mm point hardness | 75.7 | 75.0 | 75.9 | 74.9 | 70.0 | 71.0 | 67.5 | 67.7 |
| | 15.0 mm point hardness Hs5 | 80.0 | 79.8 | 79.5 | 77.8 | 77.5 | 77.7 | 74.8 | 74.9 |
| | Surface hardness Hs | 80.7 | 79.9 | 80.3 | 78.7 | 90.6 | 91.0 | 82.0 | 82.3 |
| | Hardness difference (Hs − Ho) | 32.1 | 33.2 | 31.2 | 32.0 | 41.5 | 41.7 | 32.3 | 32.4 |
| | Compression deformation amount (mm) | 3.1 | 3.3 | 3.2 | 3.4 | 3.4 | 3.4 | 3.8 | 3.8 |
| | Coefficient of restitution | 0.788 | 0.788 | 0.787 | 0.783 | 0.794 | 0.795 | 0.785 | 0.785 |
| Cover | Slab hardness (Shore D) | 65 | 65 | 65 | 65 | 65 | 65 | 65 | 65 |
| | Thickness (mm) | 1.5 | 1.5 | 1.5 | 1.5 | 1.5 | 1.5 | 1.5 | 1.5 |
| Ball | Compression deformation amount (mm) | 2.7 | 2.8 | 2.8 | 3.0 | 2.7 | 2.7 | 3.4 | 3.4 |
| | Coefficient of restitution | 0.791 | 0.791 | 0.790 | 0.786 | 0.797 | 0.798 | 0.788 | 0.788 |

TABLE 3-continued

| Golf ball No. | 9 | 10 | 11 | 12 | 13 | 14 | 15 | 16 |
|---|---|---|---|---|---|---|---|---|
| Durability | 100 | 100 | 116 | 112 | 100 | 90 | 130 | 120 |
| Driver spin rate (rpm) | −80 | −80 | −70 | −80 | −60 | −60 | −30 | −30 |

BR-730: "BR-730 (high-cis polybutadiene (cis-1,4 bond content = 96 mass %, 1,2-vinyl bond content = 1.3 mass %, Moony viscosity ($ML_{1+4}$ (100° C.) = 55, molecular weight distribution (Mw/Mn) = 3))" available from JSR Corporation
BR-11: "BR-11 (polybutadiene (cis-1,4 bond content = 95.6 mass %, Moony viscosity ($ML_{1+4}$ (100° C.) = 43.5))" available from JSR Corporation
BR-10: "BR-10 (polybutadiene (cis-1,4 bond content = 94.6 mass %, Moony viscosity ($ML_{1+4}$ (100° C.) = 27.5))" available from JSR Corporation
Zinc acrylate: "ZN-DA90S" available from Nippon Shokubai Co., Ltd.
Methacrylic acid: available from Mitsubishi Gas Chemical Company
Zinc oxide: "Ginrei R" available from Toho Zinc Co., Ltd.
Barium sulfate: "Barium sulfate BD" available from Sakai Chemical Industry Co., Ltd..
Dicumyl peroxide: "PERCUMYL (registered trademark) D" available from NOF Corporation
2-Thionaphthol: available from Tokyo Chemical Industry Co., Ltd.
Benzoic acid: available from Sigma-Aldrich (purity: 99.5% or more)
Zinc octanoate: available from Mitsuwa Chemicals Co., Ltd (purity: 99% or more)
Zinc stearate: available from Wako Pure Chemical Industries, Ltd. (purity: 99% or more)
Crosslinked rubber powder No. 8: the powder (the content percentage of the particles having a particle hardness of 65 or less in JIS-C hardness: 3 mass %) obtained by pulverizing the golf ball core formed from the rubber composition (2) Production of Cover Next, the cover material having the formulation shown in Table 4 was extruded with a twin-screw kneading extruder to prepare the cover composition in a pellet form. The extruding conditions of the cover composition were a screw diameter of 45 mm, a screw rotational speed of 200 rpm, and screw L/D=35, and the mixture was heated to 150 to 230° C. at the die position of the extruder. The obtained cover composition was injection molded onto the spherical core obtained above to produce the golf ball (diameter: 43.0 mm, mass: 45.5 g) having the spherical core and the cover covering the spherical core.

TABLE 4

| Cover composition | | |
|---|---|---|
| Formulation (parts by mass) | Himilan 1605 | 50 |
| | Himilan 1706 | 50 |
| | Titanium oxide | 4 |
| Slab hardness (Shore D) | | 65 |

Himilan 1605: Sodium ion-neutralized ethylene-methacrylic acid copolymer ionomer resin available from Du Pont-Mitsui Polychemicals Co., Ltd
Himilan 1706: Zinc ion-neutralized ethylene-methacrylic acid copolymer ionomer resin available from Du Pont-Mitsui Polychemicals Co., Ltd The golf balls No. 1-3, 7-13 and 15 comprise a spherical core formed from a core rubber composition containing (x1) soft particles in an amount of 1.0 mass % or more, wherein (x1) the soft particles have a hardness difference (Hs−Hp) of 20 or more in JIS-C hardness and a hardness difference (Hs5−Hp) of 15 or more in JIS-C hardness. These golf balls have an excellent shot feeling and flight distance due to large compression deformation amount and coefficient of restitution thereof, and have excellent durability as well. For the golf ball No. 4, even though (x1) the soft particles are contained in the crosslinked rubber powder No. 8, the content of (x1) the soft particles is so small that the durability improvement effect cannot be obtained. For the golf balls No. 5 and No. 6, no (x1) soft particles are contained in (x) the crosslinked rubber powder, thus coefficient of restitution is small and the flight distance is small. The golf balls No. 14 and No. 16 are the case not containing the crosslinked rubber powder, thus these golf balls show worse durability compared with the golf balls No. 13 and No. 15 which are the case containing the crosslinked rubber powder.

The golf ball of the present invention has an excellent shot feeling, flight distance and durability. This application is based on Japanese patent application No. 2014-074633 filed on Mar. 31, 2014, the content of which are hereby incorporated by reference.

The invention claimed is:

1. A golf ball comprising a single layered spherical core and at least one cover layer covering the spherical core, wherein
    the spherical core is formed from a core rubber composition containing (a) a base rubber, (b) a co-crosslinking agent, (c) a crosslinking initiator, (d) a carboxylic acid having 1 to 30 carbon atoms and/or a salt thereof, and (x) a crosslinked rubber powder;
    (x) the crosslinked rubber powder contains (x1) soft particles with a volume average particle size of lower than 800 μm;
        wherein a hardness difference (Hs−Hp) between a particle hardness (Hp) of the soft particles and a surface hardness (Hs) of the spherical core being 20 or more in JIS-C hardness, and
        a hardness difference (Hs5−Hp) between the particle hardness (Hp) of the soft particles and a hardness (Hs5) at 5 mm point inside the surface of the spherical core being 15 or more in JIS-C hardness;
    the core rubber composition contains (x1) the soft particles in an amount of 1.0 mass % or more and
    the core rubber composition contains (x1) the soft particles in an amount ranging from 2.1 parts by mass to 30 parts by mass with respect to 100 parts by mass of (a) the base rubber.

2. The golf ball according to claim 1, wherein (x1) the soft particles have a volume average particle of 200 μm or more and lower than 800 μm.

3. The golf ball according to claim 1, wherein the golf ball is a two-piece golf ball comprising the single layered spherical core and a single layered cover covering the spherical core.

4. The golf ball according to claim 1, wherein (x) the crosslinked rubber powder is formed from a rubber composition containing (a1) a base rubber, (b1) a co-crosslinking agent, and (c1) a crosslinking initiator, and
    (b1) the co-crosslinking agent is a zinc salt of an α,β-unsaturated carboxylic acid having 3 to 8 carbon atoms.

5. The golf ball according to claim 1, wherein (x1) the soft particles have the particle hardness (Hp) of 65 or less in JIS-C hardness.

6. The golf ball according to claim 1, wherein the spherical core has the surface hardness (Hs) of 75 or more in JIS-C hardness.

7. The golf ball according to claim 1, wherein the spherical core has a hardness difference (Hs−Ho) between the surface hardness (Hs) and a center hardness (Ho) in a range of from 25 to 45 in JIS-C hardness.

8. The golf ball according to claim 1, wherein the core rubber composition contains a zinc salt of an α, β-unsaturated carboxylic acid having 3 to 8 carbon atoms as (b) the co-crosslinking agent.

9. The golf ball according to claim 1, wherein the spherical core has the hardness (Hs5) at 5 mm point inside the surface thereof ranging from 73 to 85 in JIS-C hardness.

10. The golf ball according to claim 1, wherein the spherical core has a center hardness (Ho) ranging from 35 to 55 in JIS-C hardness.

11. The golf ball according to claim 1, wherein the core rubber composition contains (b) the co-crosslinking agent in an amount ranging from 15 parts to 50 parts by mass with respect to 100 parts by mass of (a) the base rubber.

12. The golf ball according to claim 1, wherein the core rubber composition contains (c) the crosslinking initiator in an amount ranging from 0.2 part to 5.0 parts by mass with respect to 100 parts by mass of (a) the base rubber.

13. The golf ball according to claim 1, wherein the core rubber composition contains (d) the carboxylic acid having 1 to 30 carbon atoms and/or the salt thereof in an amount ranging from 0.5 part to 40 parts by mass with respect to 100 parts by mass of (a) the base rubber.

14. The golf ball according to claim 1, wherein the core rubber composition further contains (f) an organic sulfur compound.

15. The golf ball according to claim 14, wherein the core rubber composition contains (f) the organic sulfur compound in an amount ranging from 0.05 part to 5.0 parts by mass with respect to 100 parts by mass of (a) the base rubber.

16. The golf ball according to claim 1, wherein (x1) the soft particles have a volume average particle size in a range of from 200 μm to 750 μm.

17. A two-piece golf ball comprising a single layered spherical core and a single layered cover covering the spherical core, wherein
the spherical core is formed from a core rubber composition containing (a) a base rubber, (b) a co-crosslinking agent, (c) a crosslinking initiator, and (x) a crosslinked rubber powder;
(x) the crosslinked rubber powder contains (x1) soft particles;
wherein a hardness difference (Hs–Hp) between a particle hardness (Hp) of the soft particles and a surface hardness (Hs) of the spherical core being 20 or more in JIS-C hardness; and
a hardness difference (Hs5–Hp) between the particle hardness (Hp) of the soft particles and a hardness (Hs5) at 5 mm point inside the surface of the spherical core being 15 or more in JIS-C hardness; and
the core rubber composition contains (x1) the soft particles in an amount of 1.0 mass % or more and the single layered spherical core has a hardness difference (Hs–Ho) between the surface hardness (Hs) and a center hardness (Ho) in a range of from 25 to 45 in JIS-C hardness.

18. A two-piece golf ball comprising a single layered spherical core and a single layered cover covering the spherical core, wherein
the spherical core is formed from a core rubber composition containing (a) a base rubber, (b) a co-crosslinking agent, (c) a crosslinking initiator, and (x) a crosslinked rubber powder;
(x) the crosslinked rubber powder contains (x1) soft particles;
wherein a hardness difference (Hs–Hp) between a particle hardness (Hp) of the soft particles and a surface hardness (Hs) of the spherical core being 20 or more in JIS-C hardness; and
a hardness difference (Hs5–Hp) between the particle hardness (Hp) of the soft particles and a hardness (Hs5) at 5 mm point inside the surface of the spherical core being 15 or more in JIS-C hardness; and
the core rubber composition contains (x1) the soft particles in an amount of 1.0 mass % or more and the single layered spherical core has a center hardness (Ho) ranging from 35 to 55 in JIS-C hardness.

* * * * *